July 13, 1954   S. CANICOBA   2,683,333
PROCESS FOR PRODUCING GLASS CONDENSER TUBES
Filed Jan. 18, 1951   2 Sheets-Sheet 2

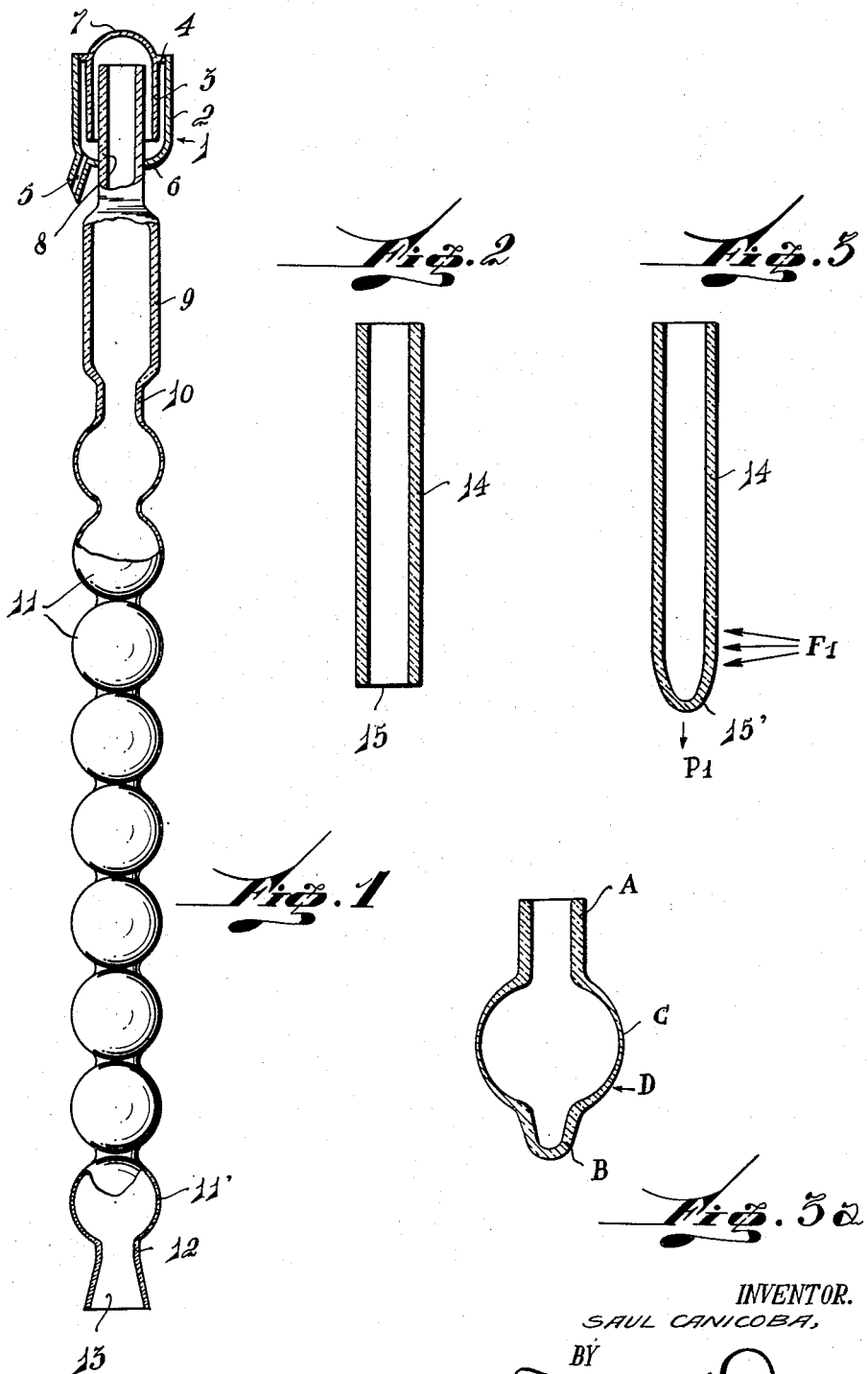

INVENTOR.
SAUL CANICOBA,
BY
Robert B. Larson
ATTORNEY

Patented July 13, 1954

2,683,333

UNITED STATES PATENT OFFICE 2,683,333

PROCESS FOR PRODUCING GLASS CONDENSER TUBES

Saul Canicoba, Buenos Aires, Argentina

Application January 18, 1951, Serial No. 206,699

6 Claims. (Cl. 49—82)

This invention relates to a process for producing glass condenser tubes for water distilling apparatus of the continuous production type.

As has already been pointed out in my co-pending applications Serial Nos. 206,696, 206,697, now abandoned, and 206,698, filed January 18, 1951, wherein such a water still is described, by using a glass condenser tube instead of a metal condenser tube the traces of metal salts which hitherto were present in distilled water produced by continuous production stills, of the prior art are eliminated.

The difficulty of using a glass condenser resides in the fact that the heat interchanging coefficient of glass is much lower than that of metal and therefore if glass were used for the condenser such a tube would have to be extraordinarily long and the quantity of cooling water extraordinarily high to be able to condense the steam produced by the boiler of the still.

It has now been possible to produce a glass condenser wherein the thickness of the walls corresponding to the condensing part is so much reduced that the heat interchanging coefficient is considerably improved and thereby the length of the glass condenser tube is substantially similar to that of a metal condenser tube and at the same time the traces of metal existing in the distilled water produced by said former metal condenser tubes, are limited.

From the foregoing it is apparent that one object of the present invention is to provide a method to produce a glass condenser tube having a condensing portion wherein the heat exchanging coefficient is considerably increased with regard to known glass condenser tubes.

Still another object resides in providing a method for producing an improved steam trap which is integral with said condenser tube and provides a better elimination of water particles which tend to enter into the condenser together with the steam.

In order to facilitate the comprehension of the different steps of the process for producing a glass condenser in accordance with the present invention, the latter will now be described by way of example, with reference to a particular structural embodiment.

In the drawings:

Fig. 1 is a part-sectional side elevation of a glass condenser tube, in accordance with the present invention.

Figs. 2, 3, 4 and 5 are longitudinal sections showing different steps for producing the condensing sphere shape portions of the glass condenser tube.

Fig. $3a$ shows a longitudinal section of a glass bulb of the known type in the art.

Figure 6:
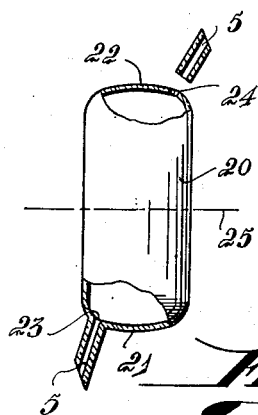

Fig. 6 is a longitudinal section showing the first step for producing the improved steam trap.

Figure 7:
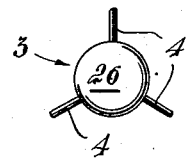

Fig. 7 is a top plan view of the inverted cup shape member provided with the separating rods.

Figure 8:
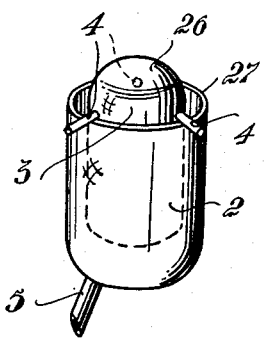

Fig. 8 is a perspective view of a steam trap wherein the inverted cup shape member is mounted on the outer cup shape member.

As can be seen in Fig. 1, the glass condenser tube produced by the present invention includes a steam trap 1, comprising an outer cup shape member 2, an inner inverted cup shape member 3 fastened to said outer cup shape member 2 by means of spacing rods 4.

Said outer cup shape member 2 is provided with a draining tube 5 at its bottom portion 6. The inner inverted cup shape member 3 has a dome shape base 7 in order to avoid that drops of water which are deposited on base 7 from steam which enters at the top portion of cup shape member 2, drop into the condenser tube, as has been clearly explained in my above referred to co-pending applications.

Cup shape member 2 is solidary with cylindrical steam-collecting tube 8 which has a second portion of larger diameter 9 which is to be housed in a preheating chamber for heat interchanging purposes as already described in my said co-pending applications.

The lower end 10 of the second portion 9 is welded together with a plurality of sphere shape portions 11 constituting the condensing part of the condenser tube.

The lower end 12 of the last sphere shape portion 11' is integral with a frusto-conical delivering end 13 into which an expending tube (not shown) may be inserted for collecting the water condensate.

In order to produce the sphere shape portions 11, a cylindrical glass tube 14 (see Fig. 2) is used, the lower end 15 of which is sealed by means of a flame as is well known in the art in order to obtain a cylindrical tube with a closed end 15' as shown in Figure 3. Thus glass tube 14 is ready for being transformed into a condenser tube having sphere shape portions 11. To this end a first flame $F_1$ is applied immediately above said lower end 15' in order to soften the portion of the glass tube heated by said first flame $F_1$. Once this portion is sufficiently softened the glass maker blows into open end of tube 14 in order to increase the diameter of the softened portion of said glass tube, and at the same time a tension $P_1$ is applied to lower end 15'. In the known processes for preparing bulbs the glass maker simply blows into the tube and thereby he obtains a bulb of uneven thickness, or more particularly the thickness of the glass will decrease rapidly where the glass offers less resistance which is usually in the middle part, so that a sphere portion such as shown in Figure 3a is obtained wherein a first portion A corresponds to the cylindrical tube which is of uniform thickness. A second portion B corresponding to the lower end which is also of uniform thickness and a third portion C corresponding to the part of less resistance which is the thinnest portion of the bulb. As can be seen in said Figure 3a the walls of bulb D increase in thickness gradually from portion C towards portions A and B. Such a bulb would not work satisfactorily as a condenser because the heat interchanging coefficient is not uniform and furthermore the resistance of the glass tube is very unequal and therefore not adequate for the use it is destinated.

Figure 4:
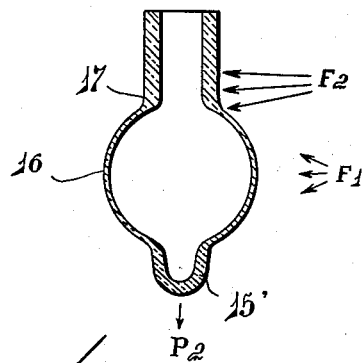

In order to obtain a glass bulb of substantially uniform thickness or better said thinness, it is a feature of the invention to apply at the same time as the glass-maker blows into open end of tube 14, a tension $P_1$ so that by said tension the portions existing between C and B as well as between C and A are decreased in thickness, thus a first sphere portion 16 is formed as shown in Figure 4, which sphere portion 16 has walls of uniform thinness whilst flame $F_1$ is gradually turned out, and this being so done in order to avoid cracking. At the same time a new flame $F_2$ is applied at upper end portion 17 so as to soften said portion and maintain flexible the upper end of said first sphere 16 and again the glass maker blows into the tube and applies at the same time a tension $P_2$ to lower end 15′ so as to enlarge said second softened portion 17 and form thereby a second sphere 18. It is very important to apply flame $F_2$ at the immediate upper end portion 17 in order to be able to produce a new sphere 18, of uniform thickness throughout its whole lengths including portion 19 which constitutes the intermediate part between spheres 16 and 18 (see Fig. 5).

In the known sphere shape glass condensers flame $F_2$ was applied at a portion spaced from the first sphere so that between the two spheres a portion of cylindrical tube existed where the thickness was not reduced and thereby considerable internal tensions existed between the sphere portions wherein the thickness was reduced and the cylindrical portions wherein the thickness of the glass was not reduced.

Figure 5:
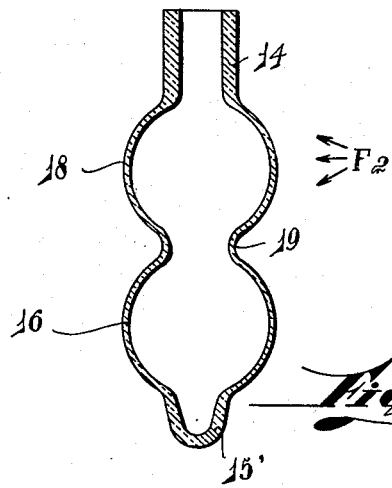

As can be seen in Fig. 5, portion 19 has substantially the same thickness as sphere portions 16 and 18 and said portion 19 is of a larger internal diameter than original tube 14, due to the blowing.

The following sphere portions are produced in an identical way of sequences, or in other words whilst the flame of a made sphere shape portion is decreased, a new flame is applied at the immediate upper end portion to soften said next portion, and to maintain the former portion in a sufficiently rigid condition to avoid substantially any further extension thereof. Once all sphere portions are produced, closed end 15′ is cut off.

Steam trap 1 is produced by making the cup shape member 2 and inner inverted cup shape member 3 separately, the process of making both cup shape members being substantially similar.

As can be seen in Fig. 6, a cylindrical tube 20 is closed at both ends to form bottom portions 21 and 22 and thereafter perforations such as 23 and 24 are made near the bottom portions 21 and 22, respectively, to which draining tubes 5 are welded. Thus two cup shape members have been formed in one operation and by cutting the body along broken line 25 the two cup shape members are separated. The cylindrical steam collecting tube 6 is later inserted by previously cutting off a part of the bottom portion of the respective cup shape member.

A similar process is used for making the inner inverted cup shape member 3, the only differences residing in that no draining tube is added, and therefore no perforation such as 23 or 24 is necessary, and furthermore once the cup shape member is produced, three spacing rods 4 (see Fig. 7) also made of glass are fixed to the base portion 26 of the inverted cup shape member 3.

As can be seen in Fig. 8 the inverted cup shape member 3 is inserted in cup shape member 2 and supported by spacing rods 4 which are then fused to upper rim 27 of outer container 2 and the projecting part of rods 4 with regard to outer rim 27 are then cut off.

It is obvious that once the different parts such as steam trap 1, cylindrical steam collecting tube 6, second portion 9 sphere shape portion 11 and frusto-conical delivering end 13 are welded together, the assembly is annealed in order to eliminate the internal stresses.

It is obvious that by building a condenser tube such as herein described, the length of the latter is considerably reduced. Furthermore comparing the glass condenser tube of this invention with the glass condenser tubes as known in the art, wherein a cylindrical part exists between the each pair of sphere portions, it can be visualized that by eliminating said cylindrical parts where the heat interchanging coefficient is very low with regard to the spherical portions, the production efficiency of the glass condenser tube is considerably increased.

I claim:

1. In a process for producing a glass condenser tube for water distilling apparatus of the continuous production type, the steps of closing a cylindrical tube at one end, applying a first flame to a portion adjacent to said end to soften the glass thereof, introducing pressure thereafter into said glass to enlarge the diameter thereof and at the same time applying tension, in addition to the tension applied by said introduction of pressure, to the heated portion of said tube in the direction of the axis of said tube until a sphere portion is formed, decreasing gradually said first flame in heating intensity whilst a second flame is applied to a portion immediately adjacent to said sphere portion, to soften it, again introducing pressure into said tube and again applying tension in like manner to said tube until a second sphere portion is formed similar to said first sphere portion, and immediately adjacent thereto, annealing the sphere portions so formed.

2. In a process for producing a glass condenser tube for water distilling apparatus of the continuous production type, the steps of applying to a cylindrical glass tube having a sealed end, a first flame to a portion adjacent to said sealed end to soften the glass thereof, introducing pressure thereafter into said glass tube and applying tension, in addition to the tension applied by said introduction of pressure, to the heated portion of said tube in the direction of the axis of said tube until a sphere portion of substantially uniform thinness is formed, turning out gradually said first flame in order to avoid cracking of said sphere portion formed, said sphere portion being the first sphere portion and having a lower end adjacent to said sealed end and an upper end, applying a second flame to a portion including said upper end of said first sphere portion and part of said cylindrical tube to soften it, again introducing pressure into said tube and again applying tension in like manner to said tube until a second sphere portion is formed similar to said first sphere portion and immediately adjacent thereto, and repeating said sequence of steps a plurality of times until a desired number of immediately adjacent sphere portions is formed, cutting off the sealed end, and annealing the plurality of sphere portions so formed.

3. A process according to claim 2, and heating one end of said tube, forming said heated end to a frusto-conical shape, with the sides thereof diverging in a direction away from said tube.

4. In the process according to claim 2, the method of making a steam trap for the condenser tube, comprising the steps of sealing the ends of a short tube, cutting said tube in half to form at least one cup-shaped member, cutting a hole in the sealed end of said cup-shaped member, mounting said cup-shaped member on the condenser tube with a substantial portion of one end thereof extending through said hole and into said cup, sealing said cup to said tube around the hole in said cup, forming a second cup of smaller diameter than said first cup, inserting the open end of said second cup into the space between said first cup and the end of condenser tube, and supporting said second cup in said inserted position.

5. A process according to claim 4, and cutting a draining hole in said first cup adjacent said condenser tube.

6. In a process for producing a glass condenser tube for water distilling apparatus of the continuous production type, the steps of applying to a cylindrical glass tube having a sealed end, a first flame to a portion adjacent to said sealed end to soften the glass thereof, introducing pressure thereafter into said glass tube and applying tension, in addition to the tension applied by said introduction of pressure, to the heated portion of said tube in the direction of the axis of said tube until a sphere portion of substantially uniform thinness is formed, turning out gradually said first flame in order to avoid cracking of said sphere portion formed, said sphere portion being the first sphere portion and having a lower end adjacent to said sealed end and an upper end, applying a second flame to a portion including said upper end of said first sphere portion and part of said cylindrical tube to soften it, again introducing pressure into said tube and again applying tension in like manner to said tube until a second sphere portion is formed similar to said first sphere portion and immediately adjacent thereto, and repeating said sequence of steps a plurality of times until a desired number of immediate adjacent sphere portions is formed, forming an extension to the last formed sphere with thicker walls than the spheres, forming a further extension to said last-named extension, sealing the end of a short tube, cutting said short tube in half to form at least one cup-shaped member, cutting a hole in said cup-shaped member, mounting said cup-shaped member on said further extension with a substantial portion there of extending through said hole and into said cup, sealing said cup to said extension around the hole in said cup, forming a second cup of smaller diameter than said first cup, inserting the open end of said second cup into the space between said first cup and said further extension, and supporting said cup in said inserted position.

References Cited in the file of this patent

UNITED STATES PATENTS

| Number | Name | Date |
|---|---|---|
| 207,241 | Blair | Aug. 20, 1878 |
| 285,936 | Theisen | Oct. 2, 1883 |
| 1,628,737 | Oliver | May 17, 1927 |
| 2,329,136 | Poglein | Sept. 7, 1943 |

OTHER REFERENCES

Scientific and Industrial Glass Blowing and Laboratory Techniques, by Barr & Anhor, published by Instruments Publishing Co., Pittsburgh, Pa.; printed January 1949.